United States Patent
Vadivel et al.

(10) Patent No.: US 10,601,959 B2
(45) Date of Patent: Mar. 24, 2020

(54) SYSTEM AND METHOD FOR MANAGING VIRTUAL ENVIRONMENTS IN AN INFRASTRUCTURE

(71) Applicant: Tata Consultancy Services Limited, Mumbai (IN)

(72) Inventors: Padmanaban Vadivel, Chennai (IN); Jayasekar Mani, Chennai (IN); Sureshbabu Ponnan, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 219 days.

(21) Appl. No.: 15/040,544

(22) Filed: Feb. 10, 2016

(65) Prior Publication Data
US 2016/0381185 A1    Dec. 29, 2016

(30) Foreign Application Priority Data
Jun. 24, 2015  (IN) .......................... 2411/MUM/2015

(51) Int. Cl.
  *H04L 29/06* (2006.01)
  *H04L 12/927* (2013.01)
  (Continued)

(52) U.S. Cl.
  CPC .......... *H04L 67/42* (2013.01); *G06F 9/45558* (2013.01); *G06F 21/53* (2013.01);
  (Continued)

(58) Field of Classification Search
  CPC ....... H04L 67/42; H04L 47/808; H04L 49/70; H04L 63/104; H04L 67/16;
  (Continued)

(56) References Cited

U.S. PATENT DOCUMENTS 4,570,217 A  *  2/1986  Allen ....................... G06F 1/14
                                                                    700/83
8,732,290 B2    5/2014  Goswami et al.
(Continued)

OTHER PUBLICATIONS

Martin Brinkmann, The Windows Task Manager (Core Windows Tools), Nov. 3, 2014, GHacks.net, URL retrieved via: https://web.archive.org/web/20141107081159/https://www.ghacks.net/2014/11/03/the-windows-task-manager-core-windows-tools/ (Year: 2014).*

*Primary Examiner* — Backhean Tiv
*Assistant Examiner* — Schquita D Goodwin
(74) *Attorney, Agent, or Firm* — Finnegan, Henderson, Farabow, Garrett & Dunner LLP (57) ABSTRACT

A central virtual server (102) and method for managing virtual environments is provided. The central virtual server (102), comprising: a memory (202) storing instructions; a hardware processor (204) configured by the instructions to: establish a communication link between the central virtual server (102) and location specific client virtual servers (104A-N), a plurality of thin clients (108A-N) that are connected to at least one of the client virtual servers (104A-N), and a plurality of local servers (110A-N), create a plurality of virtual environments based on the established communication link, process an input comprising credentials associated with a user, authenticate the credentials when the credentials match credentials stored in the memory (202), and provide role based privileges to the user for accessing data and an application hosted on one of a virtual environment, a virtual desktop, a client virtual server, and a thin client.

17 Claims, 3 Drawing Sheets

(51) Int. Cl.
  *H04L 12/931* (2013.01)
  *H04L 29/08* (2006.01)
  *G06F 21/60* (2013.01)
  *G06F 9/455* (2018.01)
  *G06F 21/53* (2013.01)

(52) U.S. Cl.
  CPC .......... *G06F 21/604* (2013.01); *H04L 47/808* (2013.01); *H04L 49/70* (2013.01); *H04L 63/104* (2013.01); *H04L 67/16* (2013.01); *G06F 2009/45587* (2013.01)

(58) Field of Classification Search
  CPC .... G06F 9/45558; G06F 21/53; G06F 21/604; G06F 2009/45587
  USPC ......................................................... 709/203
  See application file for complete search history.

(56) References Cited

U.S. PATENT DOCUMENTS

| | | | |
|---|---|---|---|
| 8,849,941 B2 | 9/2014 | Alladi et al. | |
| 9,223,598 B1* | 12/2015 | Koryakina | G06F 9/455 |
| 9,477,491 B2* | 10/2016 | Ben-Shaul | G06F 9/4451 |
| 2007/0294676 A1* | 12/2007 | Mellor | G06F 8/65 717/139 |
| 2008/0289036 A1* | 11/2008 | Kandasamy | G06F 21/6218 726/21 |
| 2009/0006537 A1 | 1/2009 | Palekar et al. | |
| 2009/0007229 A1* | 1/2009 | Stokes | G06F 21/6218 726/2 |
| 2009/0210934 A1* | 8/2009 | Innes | G06F 21/305 726/7 |
| 2011/0078532 A1* | 3/2011 | Vonog | G06F 3/1454 714/752 |
| 2011/0184993 A1 | 7/2011 | Chawla et al. | |
| 2013/0013727 A1* | 1/2013 | Walker | G06F 9/468 709/217 |
| 2013/0185774 A1* | 7/2013 | Morelli, Jr. | G06F 21/31 726/4 |
| 2013/0318150 A1* | 11/2013 | Rodriguez | G06F 21/121 709/203 |
| 2013/0318522 A1* | 11/2013 | Devireddy | H04L 12/6418 718/1 |
| 2014/0229527 A1* | 8/2014 | Bidarkar | G06F 9/54 709/203 |
| 2014/0281131 A1* | 9/2014 | Joshi | G06F 12/0804 711/103 |
| 2015/0052585 A1* | 2/2015 | Matthews | H04L 63/0823 726/4 |
| 2015/0106529 A1* | 4/2015 | Kang | G06F 21/41 709/229 |
| 2015/0373147 A1* | 12/2015 | Stuntebeck | H04L 67/327 707/734 |
| 2016/0134616 A1* | 5/2016 | Koushik | H04L 63/0807 726/9 |
| 2016/0306966 A1* | 10/2016 | Srivastava | G06F 21/31 |

* cited by examiner

SYSTEM AND METHOD FOR MANAGING VIRTUAL ENVIRONMENTS IN AN INFRASTRUCTURE

PRIORITY CLAIM

This U.S. patent application claims priority under 35 U.S.C. § 119 to: India Application No. 2411/MUM/2015, filed on Jun. 24, 2015. The entire contents of the aforementioned application are incorporated herein by reference

TECHNICAL FIELD

The embodiments herein generally relate to infrastructure and information management systems, and more particularly to managing virtual environments in an infrastructure.

BACKGROUND

In today's world, small and medium-sized enterprises (SMEs) to large organizations work on sensitive customer projects that rely on server based computing and desktop virtualization systems. These desktop virtualization systems are hosted in a central data center, and are further accessed by users remotely through a remote desktop over a shared network such as a local area network (LAN), wide area network (WAN), mobile broadband and the Internet. Such systems are provided in an identified facility and access is enabled by network connectivity between a client location and the servers for a specific offshore development centers (ODCs). Most of the organizations employ individual system, for example, regular desktops with CPU, or laptops, for users. Hence, most users work on a client environment using an individual system. Due to use of the client environments, it is difficult to implement uniform systems for productivity management. This further prevents from extracting any data from the virtual environment.

Further, in case of ramp ups and/or adding more seats in an infrastructure, there will be an increase in the bandwidth, thereby leading to requirement of a larger ODC for those additional seats. This further provides lots of restriction on information security on data storage, data access that are being access across locations, and across multiple systems, etc leading to additional infrastructure costs, and overheads. Furthermore, for a given virtual environment, where all users are connected to a client infrastructure, it is difficult to implement applications for productivity monitoring.

Virtual desktop infrastructure (VDI) is a desktop-centric service that hosts user desktop environments on remote servers or personal computers, which are accessed over a network using a remote display protocol. Typically, VDI uses disk storage for storing information for the end users to access. However, when simultaneous access of the VM's are needed, data access to the multiple virtual machines (VMs) from the disk storage may be slow. Particularly, the VDI service may be degraded when a significant number of end users boot up within a very narrow time frame and overwhelm the network with data requests, thus creating a bottleneck for the VDI service, and thereby reducing an overall performance of the systems that are being accessed by users.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a central virtual server for managing a plurality of virtual environments. The central virtual server, comprising: a memory storing instructions, and a service management application; a hardware processor coupled to the memory, wherein the hardware processor is configured by the instructions to: establish a communication link between the central virtual server and a plurality of location specific client virtual servers, wherein a plurality of thin clients are communicatively connected to a corresponding client virtual server from the plurality of location specific client virtual servers, create the plurality of virtual environments when the plurality of thin clients are communicatively connected to the corresponding client virtual server from the plurality of location specific client virtual servers, process an input comprising credentials associated with a user, authenticate the credentials when the credentials match credentials stored in the memory, and provide role based privileges to the user for accessing at least one of data and an application hosted on at least one of a virtual environment from the plurality of virtual environments, a virtual desktop, a client virtual server from the plurality of location specific client virtual servers, and a thin client from the plurality of thin clients. The memory further stores information associated with the plurality of location specific client virtual servers, the plurality of thin clients, a plurality of offshore development centers, a plurality of local servers, and a plurality of thin client infrastructures.

The user accesses the at least one of data and the application hosted on the at least one virtual environment using a thin client from the plurality of thin clients. The service management application comprises information corresponding to access rights provided to the user across the plurality of virtual environments and a plurality of applications. The service management application is configured to control and monitor the role based privileges provided to the user on the thin client and the at least one virtual environment, and perform entitlement validations on the at least one data and the application.

The hardware processor is configured to provide the role based privileges to the user to access the virtual environment for a first time interval. When the first time interval reaches a predetermined time interval, the hardware processor is further configured to process a request from the user comprising an extension of time to access the virtual environment, and extend an access time from the first time interval to a second time interval for further access of the virtual environment based on the request.

The service management application is further configured to obtain details specific to at least one of an application data, control information of the application, details of coordinates of controls present in the application, an user level application access, event logs, application logs, and application pages access from a thin client manager hosted on the thin client. The central virtual server further comprises a synchronization service application that is configured to schedule and synchronize application level logs corresponding to the plurality of applications hosted on a virtual desktop on the virtual environment. The hardware processor is further configured to obtain a plurality of captured images corresponding to one or more activities performed by the user on at least one of the thin client, the virtual environment, and the application, and generate a report based on the plurality of captured images and the activities.

In another aspect, a computer implemented method for managing a plurality of virtual environments is provided. The computer implemented method comprising: establishing a communication link between a central virtual server and a plurality of location specific client virtual servers, wherein a plurality of thin clients are communicatively connected to a corresponding client virtual server from the plurality of location specific client virtual servers; creating the plurality of virtual environments when the plurality of thin clients are communicatively connected to the corresponding client virtual server from the plurality of location specific client virtual servers; processing an input comprising credentials associated with a user; authenticating the credentials when the credentials match credentials stored in a memory; and providing role based privileges to the user for accessing at least one of data and an application hosted on at least one of a virtual environment from the plurality of virtual environments, a virtual desktop, a client virtual server from the plurality of location specific client virtual servers, and a thin client from the plurality of thin clients. The user accesses the at least one of data and the application hosted on the at least one virtual environment using a thin client from the plurality of thin clients. The computer implemented method further comprises storing using a service management application, information corresponding to access rights provided to the user across the plurality of virtual environments and a plurality of applications. The computer implemented method further comprises controlling and monitoring the role based privileges provided to the user on the thin client and the at least one virtual environment, and performing entitlement validations on the at least one data and the application.

The role based privileges are provided to the user to access the virtual environment for a first time interval. When the first time interval reaches a predetermined time interval, the computer implemented method comprises processing a request from the user comprising an extension of time to access the virtual environment; and extending an access time from the first time interval to a second time interval for further access of the virtual environment based on the request.

The computer implemented method further comprises obtaining details specific to at least one of an application data, control information of the application, details of coordinates of controls present in the application, an user level application access, event logs, application logs, and application pages access from a thin client manager hosted on the thin client. The computer implemented method further comprises synchronizing and scheduling, by using a synchronization service application, application level logs corresponding to the plurality of applications hosted on a virtual desktop on the virtual environment. The computer implemented method further comprises obtaining a plurality of captured images corresponding to one or more activities performed by the user on the virtual desktop, the virtual environment, and the application; and generating a report based on the plurality of captured images and the activities.

In yet another aspect, one or more non-transitory machine readable information storage mediums comprising one or more instructions, which when executed by one or more hardware processors causes managing a plurality of virtual environments by performing the step of: establishing a communication link between a central virtual server and a plurality of location specific client virtual servers, wherein a plurality of thin clients are communicatively connected to a corresponding client virtual server from the plurality of location specific client virtual servers; creating the plurality of virtual environments when the plurality of thin clients are communicatively connected to the corresponding client virtual server from the plurality of location specific client virtual servers; processing an input comprising credentials associated with a user; authenticating the credentials when the credentials match credentials stored in a memory; and providing role based privileges to the user for accessing at least one of data and an application hosted on at least one of a virtual environment from the plurality of virtual environments, a virtual desktop, a client virtual server from the plurality of location specific client virtual servers, and a thin client from the plurality of thin clients. The user accesses the at least one of data and the application hosted on the at least one virtual environment using a thin client from the plurality of thin clients. The instructions further comprising storing using a service management application, information corresponding to access rights provided to the user across the plurality of virtual environments and a plurality of applications. The instructions further comprising controlling and monitoring the role based privileges provided to the user on the thin client and the at least one virtual environment, and performing entitlement validations on the at least one data and the application.

The role based privileges are provided to the user to access the virtual environment for a first time interval. When the first time interval reaches a predetermined time interval, the instructions further comprising processing a request from the user comprising an extension of time to access the virtual environment; and extending an access time from the first time interval to a second time interval for further access of the virtual environment based on the request.

The instructions further comprises obtaining details specific to at least one of an application data, control information of the application, details of coordinates of controls present in the application, an user level application access, event logs, application logs, and application pages access from a thin client manager hosted on the thin client. The instructions further comprises synchronizing and scheduling, by using a synchronization service application, application level logs corresponding to the plurality of applications hosted on a virtual desktop on the virtual environment. The instructions further comprises obtaining a plurality of captured images corresponding to one or more activities performed by the user on the virtual desktop, the virtual environment, and the application; and generating a report based on the plurality of captured images and the activities.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
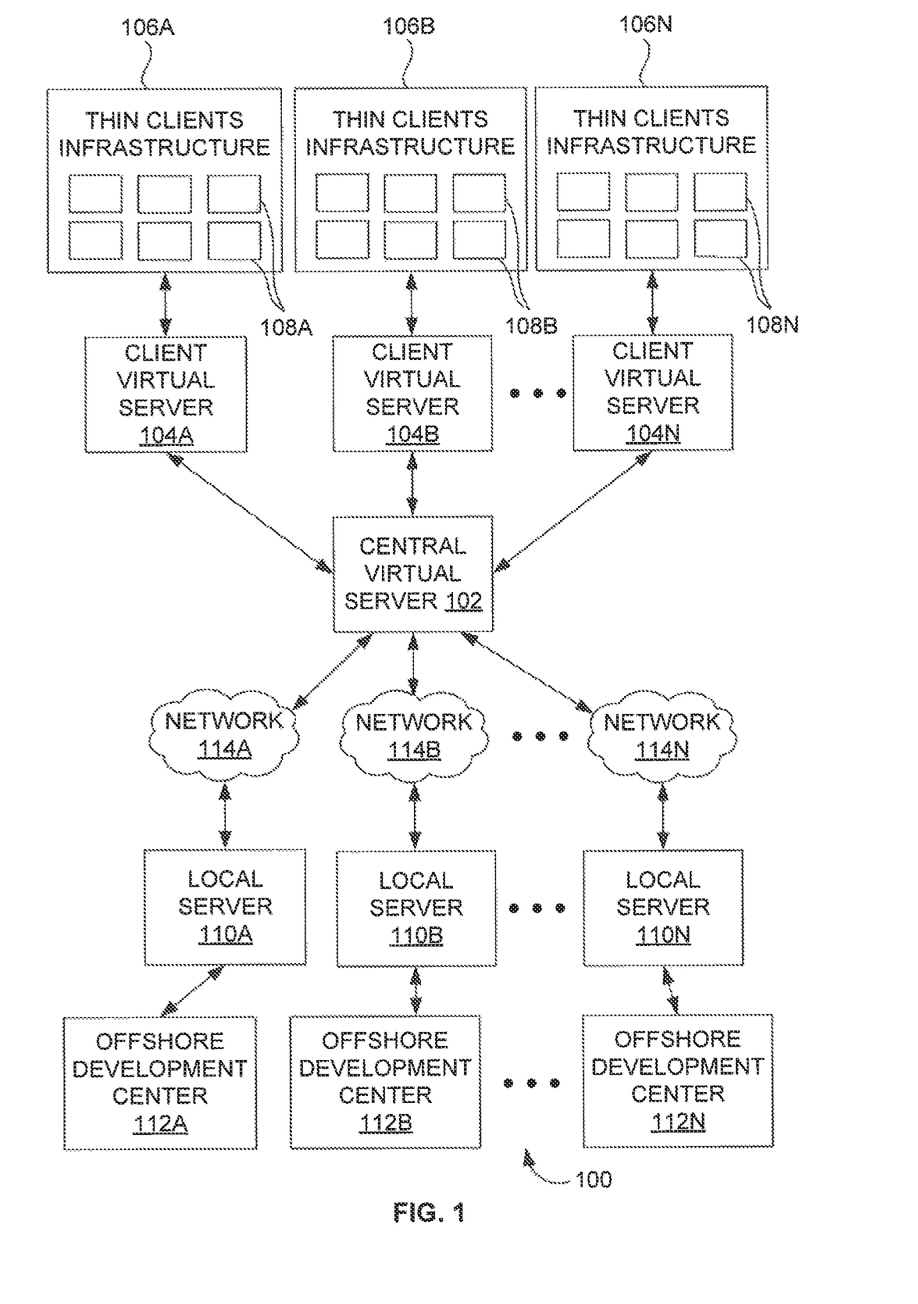
FIG. 1 illustrates an exemplary view of an information technology (IT) infrastructure for managing virtual environments, according to an embodiment of the present disclosure.
Figure 2:
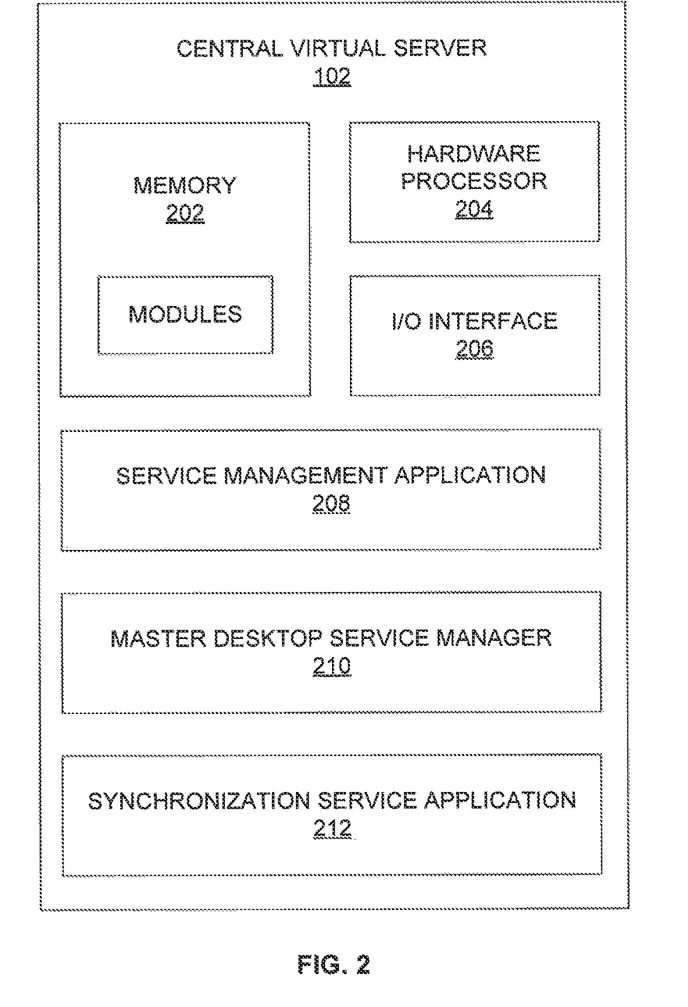
FIG. 2 is a block diagram of a central virtual server of FIG. 1, according to an embodiment of the present disclosure.
Figure 3:
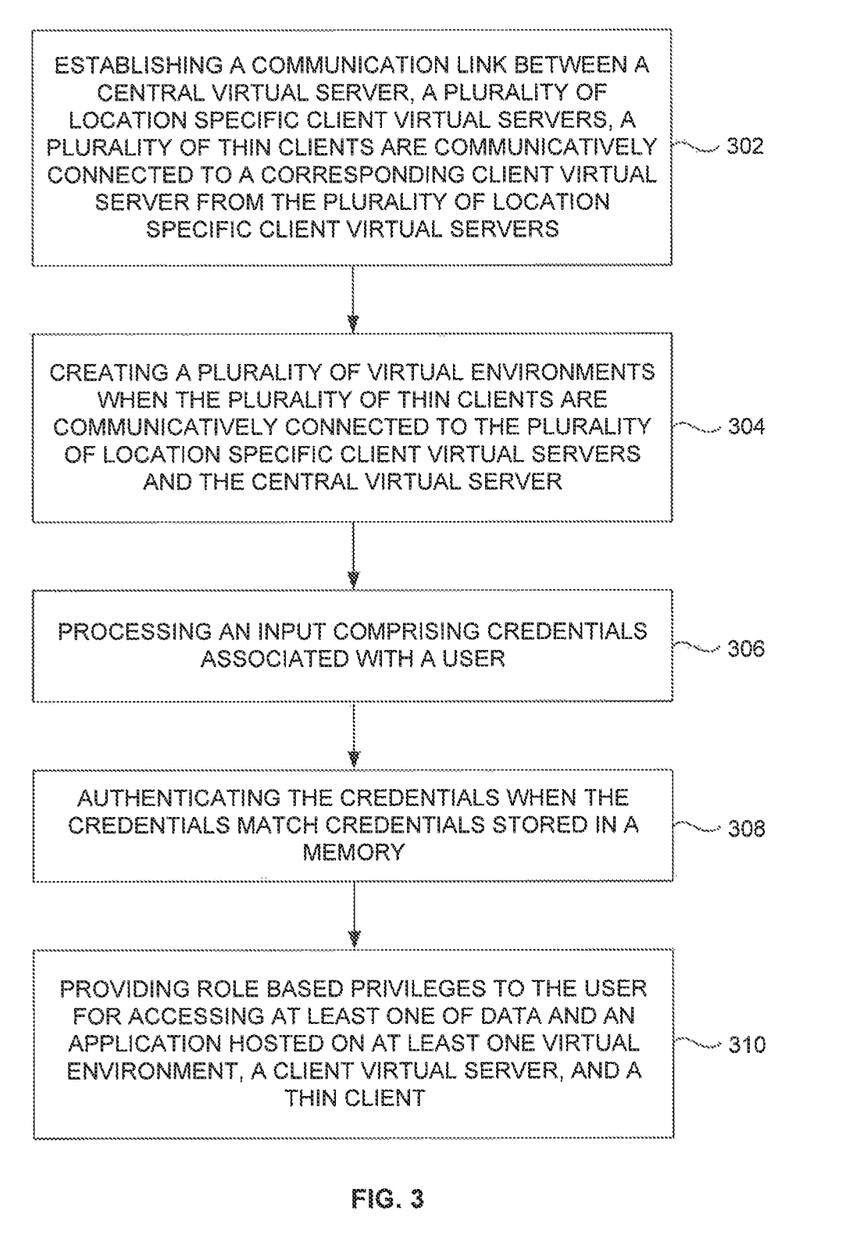
FIG. 3 is a flow diagram illustrating a method for managing the plurality of virtual environments, according to an embodiment of the present disclosure.

Referring now to the drawings, and more particularly to FIG. 1 through 3, where similar reference characters denote corresponding features consistently throughout the figures, there are shown preferred embodiments and these embodiments are described in the context of the following exemplary system and/or method.

FIG. 1 illustrates an exemplary view of an information technology (IT) infrastructure 100 for managing virtual environments according to an embodiment of the present disclosure. The information technology (IT) infrastructure 100 comprises a central virtual server 102, a plurality of client virtual servers 104A-N communicatively connected to the central virtual server 102, a plurality of thin client's infrastructures 106A-N, a plurality of local servers 110A-N, each connected to the central virtual server 102, and a plurality of offshore development centers 112A-N. The plurality of client virtual servers 104A-N may be referred to as the location specific client virtual servers 104A-N and are interchangeably used. Each thin client infrastructure 106A-N is connected to a corresponding client virtual server. Further each thin client infrastructure comprises one or more thin clients. Each of the thin clients from each thin client infrastructure is connected to a corresponding client virtual server. For example, as depicted to FIG. 1, a first thin client infrastructure 106A comprises a first set of thin clients 108A. The first set of thin clients 108A is connected to a first client virtual server 104A. Similarly, a second thin client infrastructure 106B comprises a second set of thin clients 108B. The second set of thin clients 108B is connected to a corresponding client virtual server (e.g., a second client virtual server 104B). Similarly, a third thin client infrastructure 106N comprises a third set of thin clients 108N. The third set of thin clients 108N is connected to a corresponding client virtual server (e.g., the third client virtual server 104N). The plurality of client virtual servers 104A-N are connected to the central virtual server 102 through a client virtual server manager (not shown in FIG. 1), in one example embodiment. Similarly, a first local server 110A, a second local server 110B, and a third local server 110N from the plurality of local server 110A-N are connected to the central virtual server 102. Each of the first local server 110A, the second local server 110B, and the third local server 110N are connected to a corresponding offshore development centers (herein referred to as "ODC"). For example, the first local server 110A is connected to a first offshore development center 112A. The second local server 110B is connected to a second offshore development center 112B, and the third local server 110C is connected to a third offshore development center 112N. Further, each of the offshore development center comprises a set of thin clients (not show in FIG. 1). For example, the first ODC 112A comprises a set of thin clients. Similarly, the second ODC 112B comprises another set of thin clients. In yet another example, the third ODC 112N comprises a set of thin clients. The set of thin clients from each ODCs 112A-N are identical, in one example embodiment. The set of thin clients from each ODCs 112A-N are different from each other, in one example embodiment. The central virtual server 102 establishes a communication link between the plurality of client virtual servers 104A-N, the plurality of thin clients infrastructures 106A-N, the plurality of local servers 110A-N, the plurality of offshore development centers 112A-N, which results in creating a plurality of virtual environments. The plurality of virtual environments comprises location specific virtual environments such as, but is not limited to, local virtual environment, and client location specific virtual environment. The local virtual environment, and the client location specific virtual environment are different from each other, in one example embodiment. A thin client as described herein refers to a desktop system without a hard drive.

The central virtual server 102, the plurality of client virtual servers 104A-N communicatively connected to the central virtual server 102, the plurality of thin client infrastructures 106A-N, the plurality of local servers 110A-N, each connected to the central virtual server 102, and the plurality of offshore development centers 112A-N communicate with each other over a network (or a shared network, or in a shared infrastructure). For example, as depicted in FIG. 1, the plurality of local servers 110A-N communicate with the central virtual server 102 over one or more networks 114A-N. The one or more networks 114A-N are identical, in one example embodiment. The one or more networks 114A-N are different from each other, in another example embodiment. In yet another example embodiment, the plurality of local servers 110A-N communicate with the central virtual server 102 over a shared network.

FIG. 2, with reference to FIG. 1, is a block diagram of the central virtual server 102 according to an embodiment of the present disclosure. The central virtual server 102 comprises a memory 202, a hardware processor 204, and an input/output (I/O) interface 206. The memory 202 may further include one or more modules. The memory 202, the hardware processor 204, the input/output (I/O) interface 206, and/or the modules may be coupled by a system bus or a similar mechanism.

The memory 202, may store instructions, any number of pieces of information, and data, used by a computer system, for example the central virtual server 102 to implement the functions of the central virtual server 102. The memory 202 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 202 may be configured to store information, data, applications, instructions or the like for enabling the central virtual server 102 to carry out various functions in accordance with various example embodiments. Additionally or alternatively, the memory 202 may be configured to store instructions which when executed by the hardware processor 204 causes the central virtual server 102 to behave in a manner as described in various embodiments.

The hardware processor 204 may be implemented as one or more microprocessors, microcomputers, microcontrollers, digital signal processors, central processing units, state machines, logic circuitries, and/or any devices that manipulate signals based on operational instructions. Further, the hardware processor 204 may comprise a multicore architecture. Among other capabilities, the hardware processor 204 is configured to fetch and execute computer-readable instructions or modules stored in the memory 202. The hardware processor 204 may include circuitry implementing, among others, audio and logic functions associated with the communication. For example, the hardware processor 204 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The hardware processor 204 thus may also include the functionality to encode messages and/or data or information. The hardware processor 204 may include, among other things, a clock, an arithmetic logic unit (ALU) and logic gates configured to support operation of the hardware processor 204. Further, the hardware processor 204 may include functionality to execute one or more software programs, which may be stored in the memory 202 or otherwise accessible to the hardware processor 204.

For example, the hardware processor 204 is configured by the instructions to establish a communication link (or a connection) between the central virtual server 102 and a plurality of location specific client virtual servers 104A-N. The hardware processor 204 further creates a plurality of virtual environments when the plurality of thin clients 108A-N are communicatively connected to a corresponding client virtual server (e.g., the plurality of location specific client virtual servers 104A-N. The hard are processor 204 is further configured by the instructions to process an input comprising credentials associated with a user, based on which the central virtual server 102 authenticates the credentials when the credentials match credentials (previously registered credentials) stored in the memory 202.

The hardware processor 204 is further configured to provide role based privileges to the user for accessing at least one of data and an application hosted on at least one virtual environment from the plurality of virtual environments. For example, when the user enters a corresponding user ID and password, the central virtual server validates a corresponding IP address, the user ID and the password with an Active Directory (AD or other similar technology can be used for password verification). Another process of validation comprises biometric based verification systems for authentication and authorization. Once the login credentials are verified by the central virtual server 102 (or any verification system connected to the central virtual server 102), the central virtual server 102 checks (or determines) the number of client virtual environments to which the user has access.

When the user has access to one virtual environment then the central virtual server 102 automatically directs the user to a respective client virtual environment. When the user has access to multiple client virtual environments (or more than one), then a list of client virtual environments may be prompted (or displayed) to the user. The user can choose an appropriate client virtual environment which he/she wants to access. Based on a selection of a client virtual environment by the user, a corresponding client virtual environment is enabled.

The application that are being accessed by the user may be hosted in a client virtual server or in one of a virtual system (or a virtual desktop). The terms "virtual system" and "virtual desktop" may be interchangeably used. When the application is hosted in a client virtual server, then the same application can be accessed across any of a virtual system, in one example embodiment. When an application is a desktop based application, the application is installed in only one of a virtual system, in another example embodiment.

Other types of applications comprise, but are not limited to, Windows® application, web applications, Mainframe® systems, custom built applications, platform based applications, Enterprise Resources Planning (ERP) applications like SAP®, Seibel®, Oracle®, and so on. A virtual system (also referred herein as a virtual machine) is an emulation of a particular computer system. Virtual machines operate based on the computer architecture and functions of a real or hypothetical computer, and their implementations may involve specialized hardware, software, or a combination of both. In other words, the virtual system (or a virtual machine) shares physical hardware resources with other users but isolates an operating system or an application to avoid changing the end-user experience. The user accesses the at least one of data and the application hosted on the at least one virtual environment (or a virtual system) using a thin client.

The central virtual server 102 further comprises a service management application 208 that comprises information corresponding to access rights provided to the user across the plurality of virtual environments and a plurality of applications. The service management application 208 when executed by the hardware processor 204 is configured to control and monitor the role based privileges provided to the user on the thin client and the at least one virtual environment (or a virtual system), and perform entitlement validations accordingly. Entitlement validations comprise, but is not limited to, revoke entitlement validation (including partial/complete), where one or more accesses are removed from an entire application, or from specific pages of the application. Another entitlement validation comprises restriction entitlement, where one or more controls present in the application may be disabled, or specific actions may be temporarily disabled. Such actions comprise, but are not limited to, viewing a specific user interface (or screens) of the application through masking. Yet another entitlement validation may comprise a condition based entitlement provisioning, where the central virtual server 102 may determine and provide certain type of conditions and access, such as, but not limited to, time based (or session based), a scenario based, an input type based, and so on.

Alternatively, the central virtual server 102 may receive one or more inputs from a user (e.g., an administrator, a supervisor, etc.), that enables the central virtual server 102 to configure and setup an entitlement validation outside the virtual environment (e.g., a client virtual environment). Such an entitlement validation may comprise temporary access revoke partly or fully, time based access revocation, and so on. The central virtual server 102 (or the hardware processor 204) provides the role based privileges to the user to access the virtual environment for a specific time interval (e.g., for a first time interval).

When the first time interval reaches a predetermined time interval, the hardware processor 204 processes a request from the user comprising an extension of time to access the virtual environment (e.g., a client virtual environment or a local virtual environment), or any other privileges to perform one or more activities within the virtual environment. Based on the request, and a user type (or the access type), the hardware processor 204 extends an access time from the first time interval to a second time interval for further access of the virtual environment. The request may further comprise content type that is to be or being accessed. On the other hand, the service management application 208 obtain details specific to at least one of an user level application access, event logs, application logs, and application pages access from a thin client manager hosted on the thin client. User level application access comprises, but are not limited to, client applications such as an account opening application, transaction processing application (e.g., web application, a Windows® application or an ERP application, Mainframe® systems, etc.) hosted in a client environment (e.g., a client data center). Similarly, event logs may comprise, but are not limited to, SWIFT messages (e.g., swift codes for fund transfers or other banking transactions), output alerts, and messages that are captured to determine transaction completion status. Similarly, application logs may comprise, but is not limited to, a log file saved by a corresponding application in a specific location (e.g., a specific folder). The details may further include, but is not limited to, an application data, a control information specific to one or more applications (e.g., moderating specific sections of the application), details of coordinates (e.g., position of an object in the screen) of controls present in the application, and so on. For example, application data comprises, headers (or header information), a uniform resource location (URL) of the application. The URL may be an internet address, or an address to a locally stored application (or any data path related to the application). Similarly, control information comprises details of labels, control identifiers used in the application. As described herein 'label' refers to a control explaining the nature of field. For example, username is a label in a specific webpage that requires a login. Control identifier is the name of the label used to code, for example.

The entitlement validation is performed by implementing a desktop service in each of the plurality of client virtual servers 104A-N which further connects to a corresponding task manager, in one example embodiment. As described herein "the desktop service" is a desktop based service level utility which runs in the individual virtual desktops. This service will be monitored and controlled by the master desktop service manager. The desktop service is executed in all virtual systems (e.g., Citrix® desktops) and functions like a managed application accessible from or within a virtual environment (e.g., a client Citrix® environment).

For an external entity, this is similar to an application. Since, the client virtual environment connection is established through a virtual server (e.g., the central virtual server 102 or any an intermediary virtual server such as the client virtual server manager as described above), this facilitates hosting of one or more desktop services through a centralized application. The desktop service is hosted in each virtual desktop infrastructure (VDI) and Citrix® desktops through the central virtual server 102 or any the intermediary virtual server. The central virtual server 102 and/or the intermediary virtual server collect data from the citrix virtual environment and have the same saved and stored as logs in the intermediary virtual server. The log file is further analyzed by the application. The log file comprises, but is not limited, date and time stamps related to logins and log outs, and may further include information related to operations performed by a user. The desktop service obtains details of applications and processes from task manager (e.g., comprising running processes, details of active windows/applications, and so on.).

Using these details, the total running time of processes, their active and inactive status, memory utilization, CPU cycle time utilization, and so on, can be computed. These details enable the central virtual server 102, or the entire setup (e.g., an infrastructure configuration) for determining available resources, thereby resulting in an effective utilization of hardware resources, such as storage units (or memory, hard disks), reducing CPU cycle time (or clock time), an increase in response time to memory access, and so on. Further, the application updates the desktop services on access rights and other constraints, etc. The desktop service is linked with the task manager to control and as well as monitor the time spent in accessing various applications, and further implements application access control, clocks the time spent in navigation, and obtains updates from the task manager. This information is further stored in the logs generated in the central virtual server 102 (or the intermediary virtual server). Each of the desktop services is managed by a master desktop service manager 210 hosted in the central virtual server 102.

The central virtual server 102 further comprises a synchronization service application 212 that when executed by the hardware processor 204 is configured to schedule and synchronize application level logs corresponding to the plurality of applications hosted on a virtual system on the virtual environment.

The central virtual server 102 further obtains a plurality of captured images corresponding to one or more activities performed by the user on at least one of the thin client, the virtual environment, and the application, and accordingly generates a report based on the plurality of captured images and the activities. The collected user level details are grouped into at least one of a client level, a user level, or an organization level, and this data is made available in the form of customizable reports to both individual users as well as supervisors (including other stakeholders). The dashboards and reports can perform multiple slice and dice view of the data and showcase trend analysis, deviation patterns, and so on (e.g., by presenting a customized user interface).

This enables the central virtual server 102 to provide an access (es) to applications and the plurality of virtual environment agnostic to (or independent of) any location. This ensures that a continuity in business is established across multiple locations.

Alternatively, the central virtual server 102 may execute the modules, comprising a communication link establishment module that when executed by the hardware processor 204 establishes a communication across the central virtual server 102, the plurality of client virtual servers 104A-N, the plurality of thin clients infrastructures 106A-N, the plurality of local servers 110A-N, and the plurality of offshore development centers 112A-N. The modules further comprise a virtual environment creation module that when executed by the hardware processor 204 creates the plurality of virtual environments based on the established communication link. The modules further comprise an input processing module that when executed by the hardware processor 204 processes an input comprising credentials associated with a user (e.g., an end user, an employee, an employer, a customer, a client, an administrator, and so on). The modules further comprise a validation/authentication module that when executed by the hardware processor 204 authenticates the input credentials of the user by validating the credentials against credentials stored in the memory 202. The modules further comprise a privilege module that when executed by the hardware processor 204 provides one or more role based privileges to the user for accessing at least one of data and an application hosted on at least one a virtual system, a client virtual server, and a virtual environment from the plurality of virtual environments.

The modules further comprise a control and entitlement validation module (not shown in FIG. 2) that when executed by the hardware processor 204 controls and monitoring the role based privileges provided to the user on a thin client and the at least one virtual environment, and accordingly perform one or more entitlement validations on the at least one of data and the application(s). The modules such as, but are not limited to, the communication link establishment module, the virtual environment creation module, the input processing module, the validation/authentication module, the privilege module, and the control and entitlement validation module are implemented as at least one of a logically self-contained part of a software program, a self-contained hardware component, and/or, a self-contained hardware component, with a logically self-contained part of a software program embedded into each of the hardware component that when executed perform the above method described herein, in one embodiment.

Additionally, each of the plurality of client virtual servers 104A-N, and each of the local servers 110A-N comprises a memory, a hardware processor, an input-output interface, and so on, similar to the central virtual server 102, and perform one or more methodologies described herein. Furthermore, the central virtual server 102 comprises an internal virtual server manager (not shown in FIG. 1-2) that managers (or controls/monitors) one or more operations performed by the central virtual server 102, the plurality of client virtual servers 104A-N, and the plurality of local servers 110A-N. It may be understood that the central virtual server 102, the plurality of client virtual servers 104A-N, the plurality of local servers 110A-N, and the internal virtual server manager may also be implemented in a variety of computing systems, such as a laptop computer, a desktop computer, a notebook, a workstation, a mainframe computer, a server, a network server, a tablet, a mobile phone, and in a cloud-based environment.

FIG. 3, with reference to FIG. 1 and FIG. 2, is a flow diagram illustrating a computer implemented method for managing the plurality of virtual environments according to an embodiment of the present disclosure. In step 302, a communication link is established between the central virtual server 102 and the plurality of location specific client virtual servers 104A-N, wherein the plurality of thin clients 108A-N are communicatively connected to a corresponding client virtual server from the plurality of location specific client virtual servers 104A-N. In step 304, the plurality of virtual environments are created when the plurality of thin clients 208A-N are communicatively connected to the corresponding client virtual server from the plurality of location specific client virtual servers 104A-N. In step 306, an input comprising credentials associated with a user (e.g., an end user, an employee, an employer, a customer, a client, an administrator, and so on) is processed. In step 308, the credentials are authenticated when the credentials match the credentials stored in the memory 202. In step 310, one or more role based privileges are provided to the user for accessing at least one of data and an application hosted on at least one a virtual system, a client virtual server, and a virtual environment from the plurality of virtual environments.

The method further comprises controlling and monitoring the role based privileges provided to the user on a thin client and the at least one virtual environment, and performing entitlement validations on the at least one of data and the application. The method further comprises processing a request from the user comprising an extension of time to access the virtual environment when an access time (a first time interval) reaches a predetermined time interval, and extending the access time from the first time interval to a second time interval for further access of the virtual environment based on the request.

The method further comprises obtaining details specific to at least one of a user level application access, event logs, application logs, and application pages access from a thin client manager hosted on the thin client. Application level logs corresponding to the plurality of applications hosted on a virtual desktop on the virtual environment are synchronized and accordingly scheduled using the synchronization service application 212 stored in the memory 202 of the central virtual server 102.

The proposed embodiments describe a system and method for managing a virtual environment by implementing the thin clients (e.g., the plurality of thin clients 108A-N, and the thin clients from the plurality of offshore development centers 112A-N) without local storage. The plurality of virtual environment created may be client specific, such as a Citrix® virtual environment, where an offshore development 112A-N center at a location is connected to a client virtual server. The central virtual server 102 is used by one or more users.

The central virtual server 102 is connected to the plurality of client virtual servers 104A-N, thereby ensuring access to any client's virtual environment from any location. A virtualized desktop service (e.g., the desktop service as described above) is deployed in all virtual environments to extract and collect data and share details of application level usage. This type of desktop service is executed (or run) on an operating system with an administrative privilege(s) to control user access and application management (e.g., interaction with installed parent applications and remote applications). This configuration or a setup as described in FIG. 1-3, enables a supervisor (or any other similar user) to temporarily block access to specific applications depending on volume, and other business parameters, thereby ensuring a collection of data specific to productivity in a virtual environment and share the same outside through the central virtual server 102. Business parameters comprise, but are not limited to, priority and criticality of tasks and/or activities to be carried out (or performed), specific cut off times for transaction processing, regulatory reporting, value added activities, and non-value added activities. For example, emails can be non-value added activity for an outsourced service provider (e.g., for a transaction processing associate) working on a client application.

The proposed embodiments establishes multiple virtual environment with proper authentication and authorization, which further enables an offline access to data and application in a virtual environment through transient storage in a temporary memory over the network. This setup further provides a mobile interface to each of the virtual environment, thereby enabling a user access from any remote location to any virtual environment over the internet with an appropriate authentication (or session state maintenance). This further provides the central virtual server 102 to securely capture data and extract from the virtual environments remotely without any user interaction. This results in reduced storage space as one or more users utilize a central storage (or any similar repository for data storage), and thus ensuring maximum data availability in the network as no data is stored locally. This ensures that there is no data loss, thereby providing complete data and information security, and eliminating the need of data purging and monitoring of data transfer thus providing a complete business continuity planning in a secured environment site (or location) close of business. The proposed embodiments implement storing data in a network memory, by utilizing multiple share drives in the local and virtual environment which facilitates multiple options of data storage. This ensures that there is no dependency of individuals to access any data. Also, since the data is stored and accessed only within office premises data security is enhanced.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

We claim:

1. A computer implemented method for managing a plurality of virtual environments, comprising:
    establishing a communication link between a central virtual server and a plurality of location specific client virtual servers, wherein a plurality of thin clients are communicatively connected to a corresponding client virtual server from said plurality of location specific client virtual servers to facilitate hosting of one or more desktop services through a centralized application, wherein each of the one or more desktop services is managed by a desktop service manager hosted on each virtual desktop infrastructure (VDI) through the central virtual server;
    creating said plurality of virtual environments when said plurality of thin clients are communicatively connected to said corresponding client virtual server from said plurality of location specific client virtual servers;
    obtaining information corresponding to data and an application of each of the one or more desktop services, wherein the information comprises operations performed by a user;
    determining running time of the application, active and inactive status, memory utilization, central processing unit (CPU) cycle time utilization of each of the one or more desktop services based on the obtained information;
    determining available resources in each of the plurality of virtual environments based on the determined running time of the application, active and inactive status, memory utilization, central processing unit (CPU) cycle time utilization of each of the one or more desktop services based on the obtained information;
    providing role based privileges to a user for accessing data and an application hosted on at least one virtual environment from said plurality of virtual environments based on the available resources, wherein the at least one virtual environment is selected by the user from a displayed list of virtual environments upon determining that more than one virtual environments are accessible to the user;
    performing entitlement validations on said data and said application based on the role based privileges, wherein the entitlement validations comprises revoking access from the application, specific pages of the application, restriction entitlement of disabling controls present in the application, disabling actions of viewing the user interface of the application through masking and condition based entitlement provisioning;
    obtaining a plurality of captured images corresponding to activities performed by the user on the thin client, the virtual environment, and the application, and
    generating a report based on the plurality of captured images and the activities.

2. The computer implemented method as claimed in claim 1, wherein said user accesses said data and said application hosted on said at least one virtual environment using a thin client from said plurality of thin clients.

3. The computer implemented method as claimed in claim 1, further comprising storing using a service management application, information corresponding to access rights provided to said user across said plurality of virtual environments and a plurality of applications.

4. The computer implemented method as claimed in claim 1, further comprising
    controlling and monitoring said role based privileges provided to said user on said thin client and said at least one virtual environment.

5. The computer implemented method as claimed in claim 1, wherein said role based privileges are provided to said user to access said virtual environment for a first time interval.

6. The computer implemented method as claimed in claim 5, further comprising when said first time interval reaches a predetermined time interval,
    processing a request from said user comprising an extension of time to access said virtual environment; and
    extending an access time from said first time interval to a second time interval for further access of said virtual environment based on said request.

7. The computer implemented method as claimed in claim 1, further comprising obtaining details specific to at least one of an application data, control information of the application, details of coordinates of controls present in the application, an user level application access, event logs, application logs, and application pages access from a thin client manager hosted on said thin client.

8. The computer implemented method as claimed in claim 3, further comprising synchronizing and scheduling, by using a synchronization service application, application level logs corresponding to said plurality of applications hosted on a virtual desktop on said virtual environment.

9. A central virtual server for managing a plurality of virtual environments, comprising:

a memory storing instructions, and a service management application;

a hardware processor coupled to said memory, wherein said hardware processor is configured by said instructions to:

establish a communication link between said central virtual server and a plurality of location specific client virtual servers, wherein a plurality of thin clients are communicatively connected to a corresponding client virtual server from said plurality of location specific client virtual servers to facilitate hosting of one or more desktop services through a centralized application, wherein each of the one or more desktop services is managed by a desktop service manager hosted on each virtual desktop infrastructure (VDI) through the central virtual server;

create said plurality of virtual environments when said plurality of thin clients are communicatively connected to said corresponding client virtual server from said plurality of location specific client virtual servers;

obtain information corresponding to data and an application of each of the one or more desktop services, wherein the information comprises operations performed by a user;

determine running time of the application, active and inactive status, memory utilization, central processing unit (CPU) cycle time utilization of each of the one or more desktop services based on the obtained information;

determine available resources in each of the plurality of virtual environments based on the determined running time of the application, active and inactive status, memory utilization, central processing unit (CPU) cycle time utilization of each of the one or more desktop services;

provide role based privileges to a user for accessing data and an application hosted on at least one virtual environment from said plurality of virtual environments based on the available resources, wherein the at least one virtual environment is selected by the user from a displayed list of virtual environments upon determining that more than one virtual environments are accessible to the user;

perform entitlement validations on said data and said application based on the role based privileges, wherein the entitlement validations comprises revoking access from the application, specific pages of the application, restriction entitlement of disabling controls present in the application, disabling actions of viewing the user interface of the application through masking and condition based entitlement provisioning;

obtain a plurality of captured images corresponding to activities performed by the user on the thin client, the virtual environment, and the application, and generate a report based on the plurality of captured images and the activities.

10. The central virtual server as claimed in claim 9, wherein said user accesses said data and said application hosted on at least one virtual environment using a thin client from said plurality of thin clients.

11. The central virtual server as claimed in claim 9, wherein said service management application comprises information corresponding to access rights provided to said user across said plurality of virtual environments and a plurality of applications.

12. The central virtual server as claimed in claim 9, wherein said service management application is configured to:

control and monitor said role based privileges provided to said user on said thin client and said at least one virtual environment.

13. The central virtual server as claimed in claim 9, wherein said hardware processor is configured to provide said role based privileges to said user to access said virtual environment for a first time interval.

14. The central virtual server as claimed in claim 13, wherein when said first time interval reaches a predetermined time interval, said hardware processor is further configured to process a request from said user comprising an extension of time to access said virtual environment, and extend an access time from said first time interval to a second time interval for further access of said virtual environment based on said request.

15. The central virtual server as claimed in claim 9, wherein said service management application is configured to obtain details specific to at least one of an application data, control information of the application, details of coordinates of controls present in said application, an user level application access, event logs, application logs, and application pages access from a thin client manager hosted on said thin client.

16. The central virtual server as claimed in claim 9, further comprising a synchronization service application that is configured to schedule and synchronize application level logs corresponding to said plurality of applications hosted on a virtual desktop on said virtual environment.

17. A non-transitory computer readable medium embodying a program executable by a hardware processor of a central virtual server, the program comprising:

a program code for establishing a communication link between a central virtual server and a plurality of location specific client virtual servers, wherein a plurality of thin clients are communicatively connected to a corresponding client virtual server from said plurality of location specific client virtual servers to facilitate hosting of one or more desktop services through a centralized application, wherein each of the one or more desktop services is managed by a desktop service manager hosted on each virtual desktop infrastructure (VDI) through the central virtual server;

a program code for creating said plurality of virtual environments when said plurality of thin clients are communicatively connected to said corresponding client virtual server from said plurality of location specific client virtual servers;

a program code for obtaining information corresponding to data and an application of each of the one or more desktop services, wherein the information comprises operations performed by a user;

a program code for determining running time of the application, active and inactive status, memory utilization, central processing unit (CPU) cycle time utilization of each of the one or more desktop services based on the obtained information;

a program code for determining available resources in each of the plurality of virtual environments based on the determined running time of the application, active and inactive status, memory utilization, central processing unit (CPU) cycle time utilization of each of the one or more desktop services based on the obtained information;

a program code for providing role based privileges to a user for accessing data and an application hosted on at least one virtual environment from said plurality of virtual environments based on the available resources, wherein the at least one virtual environment is selected by the user from a displayed list of virtual environments upon determining that more than one virtual environments are accessible to the user;

a program code for performing entitlement validations on said data and said application based on the role based privileges, wherein the entitlement validations comprises revoking access from the application, specific pages of the application, restriction entitlement of disabling controls present in the application, disabling actions of viewing the user interface of the application through masking and condition based entitlement provisioning;

a program code for obtaining a plurality of captured images corresponding to activities performed by the user on the thin client, the virtual environment, and the application, and a program code for generating a report based on the plurality of captured images and the activities.

* * * * *